(12) United States Patent
Izumikawa et al.

(10) Patent No.: US 12,000,507 B2
(45) Date of Patent: Jun. 4, 2024

(54) PIPE, SPOOL FORMING DIE, AND PIPE MANUFACTURING METHOD

(71) Applicant: FUTABA INDUSTRIAL CO., LTD., Aichi (JP)

(72) Inventors: Daisuke Izumikawa, Aichi (JP); Mikuto Wakayama, Aichi (JP); Masahito Hosoi, Aichi (JP); Takashi Sumiya, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 17/330,991

(22) Filed: May 26, 2021

(65) Prior Publication Data

US 2022/0003341 A1  Jan. 6, 2022

(30) Foreign Application Priority Data

Jul. 1, 2020  (JP) ................................ 2020-114147

(51) Int. Cl.
*F16L 13/14* (2006.01)
(52) U.S. Cl.
CPC ....... *F16L 13/141* (2013.01); *F16L 2013/145* (2013.01)
(58) Field of Classification Search
CPC ....... F16L 13/14; F16L 13/141; F16L 13/165; F16L 13/161; F16L 2013/145; F16L 19/028; F16L 19/0283; F16L 19/0286; F16L 33/2076
USPC ....................................................... 285/382
See application file for complete search history.

(56) References Cited

U.S. PATENT DOCUMENTS

| | | | | |
|---|---|---|---|---|
| 1,837,103 A | * | 12/1931 | Betz | ........................ F16L 13/04 285/382 |
| 2,522,194 A | * | 9/1950 | Richardson | ......... F16L 19/0286 285/382 |
| 2,983,506 A | * | 5/1961 | Bertsch | |
| 3,467,414 A | * | 9/1969 | Downing | .............. F16L 13/165 |
| 4,269,438 A | * | 5/1981 | Ridenour | .............. F16L 13/165 |
| 5,333,917 A | * | 8/1994 | Davey | |

(Continued)

FOREIGN PATENT DOCUMENTS

| | | |
|---|---|---|
| JP | H05141580 A | 6/1993 |
| JP | H11-290979 A | 10/1999 |

(Continued)

OTHER PUBLICATIONS

JP-2009024718-A—Machine Translation—English (Year: 2009).*

(Continued)

*Primary Examiner* — William S. Choi
(74) *Attorney, Agent, or Firm* — David D. Brush; Westman, Champlin & Koehler, P.A.

(57) ABSTRACT

A pipe extending from a first side toward a second side includes a side wall and a spool. The spool formed in the side wall is bent so as to protrude from an outer circumferential surface of the pipe, and extends to surround the outer circumferential surface. The spool includes a first portion located on the first side and a second portion located on the second side. There is a clearance between the first portion and the second portion in a top region of the spool, and the first portion and the second portion substantially abut each other in a base region.

2 Claims, 6 Drawing Sheets

SECOND SIDE ⟵⟶ FIRST SIDE (56) References Cited

U.S. PATENT DOCUMENTS

| | | | | |
|---|---|---|---|---|
| 5,387,016 A | * | 2/1995 | Joseph | F16L 33/2076 |
| | | | | 285/382 |
| 5,622,394 A | * | 4/1997 | Soles | F16L 33/2076 |
| 6,543,817 B1 | * | 4/2003 | Turner | F16L 19/028 |
| 2010/0253066 A1 | | 10/2010 | Cygler, III et al. | |
| 2011/0169259 A1 | * | 7/2011 | Schulze | F16L 19/0286 |
| 2011/0203677 A1 | * | 8/2011 | Park | F16L 33/2076 |
| 2012/0032438 A1 | * | 2/2012 | Pechtold | F16L 19/0286 |

FOREIGN PATENT DOCUMENTS

| | | | |
|---|---|---|---|
| JP | 2009-024718 A | | 2/2009 |
| JP | 2012519258 A | | 8/2012 |
| KR | 200206310 Y1 | * | 12/2000 |

OTHER PUBLICATIONS

KR200206310Y1—Machine Translation—English (Year: 2000).*
Notice of Reasons for Refusal dated May 13, 2022, for corresponding Japanese Application No. 2020-114147, filed Jul. 1, 2020.
Decision of Refusal dated Sep. 27, 2022, for corresponding Japanese Application No. 2020-114147, filed Jul. 1, 2020.

* cited by examiner

PIPE, SPOOL FORMING DIE, AND PIPE MANUFACTURING METHOD

CROSS-REFERENCE TO RELATED APPLICATIONS

This application claims the benefit of Japanese Patent Application No. 2020-114147 filed on Jul. 1, 2020 with the Japan Patent Office, the entire disclosure of which is incorporated herein by reference.

BACKGROUND

The present disclosure relates to a pipe with a spool, a spool forming die to form a spool in a pipe, and a pipe manufacturing method using a spool forming die.

There is a known technique to bend a part of a side wall of a pipe so as to protrude from an outer circumferential surface, thereby to form a spool circling the outer circumferential surface. The spool is used to connect the pipe with another member. An annular flange portion disclosed as one example of a spool in Japanese Unexamined Patent Application Publication No. H5-141580 protrudes from an outer circumferential surface of a pipe and has a first portion and a second portion overlapping each other in an axial direction of the pipe. The first portion and the second portion connect together in a bent portion at a top of the spool.

SUMMARY

In the case of the annular flange portion disclosed in Japanese Unexamined Patent Application Publication No. H5-141580, no clearance is provided between the first portion and the second portion, thus resulting in a large degree of bending at the top of the spool. Accordingly, stress is concentrated at the top, and cracks are more likely to be caused.

In one aspect of the present disclosure, it is desirable to reduce variation in height of spools and reduce generation of cracks.

One aspect of the present disclosure is a pipe that extends from a first side toward a second side, and comprises a side wall and a spool. The side wall separates an inside and an outside of the pipe. The spool is a part of the side wall formed to be bent so as to protrude from an outer circumferential surface of the pipe and extending to surround the outer circumferential surface. The spool comprises a first portion located on the first side and a second portion located on the second side. There is a clearance between the first portion and the second portion in a top region that comprises an outer circumferential end of the spool. The first portion and the second portion substantially abut each other in a base region located between the top region and a region of the side wall around the spool.

According to the above-described configuration, in the base region of spool, the first and the second portion substantially abut each other, and thus variation in height of the spool can be reduced. On the other hand, in the top region, a clearance is formed between the first portion and the second portion, and thus excessive bending of the spool in the top region can be inhibited and concentration of stress in the top region can be reduced. Accordingly, variation in height of the spool and generation of cracks can be reduced.

At least one of the first portion or the second portion in the top region may comprise a straight part that extends substantially planarly.

According to the above-described configuration, by bringing the straight part of the spool into surface contact with a lock mechanism of another member, connection between the pipe and another member can be locked. Specifically, it can be configured such that, in case of separating a locked pipe from another member, the straight part is brought into surface contact with the lock mechanism of another member, thereby preventing separation. This configuration leads to an increased load required to separate the locked pipe and another member. Thus, it is possible to inhibit release of locking between the pipe and another member.

The straight part may be formed in the top region and the base region. According to this configuration, it is possible to properly inhibit release of locking between the pipe and another member.

The spool may be formed in a vicinity of an opening of the pipe on the second side. According to this configuration, the spool can be utilized to connect the pipe to another member.

The straight part may be formed in the first portion in the top region.

According to this configuration, it is possible to suitably inhibit release of locking between a pipe and another member connected to the pipe.

The spool may be formed in a part of the pipe where pipe expansion or pipe contraction has been performed.

A part that has undergone pipe expansion or pipe contraction is likely to have work-hardening problems as compared with other parts. According to the above-described configuration, however, concentration of stress in the top region of the spool that is formed in the part that has undergone pipe expansion or pipe contraction can be reduced. Thus, generation of cracks can be reduced effectively.

The pipe may be made of iron.

According to this configuration, it is possible to appropriately reduce variation in height of the spool and generation of crack.

Another aspect of the present disclosure is a spool forming die to be used with an additional die to form the spool of the pipe described above. The spool forming die comprises an outside surface, an abutment surface, and a non-abutment surface. The outside surface is configured to be arranged, when forming the spool, to cover the outer circumferential surface and surround the outer circumferential surface. The abutment surface is configured to be arranged, when forming the spool, to surround the outer circumferential surface, while maintaining a distance from the outer circumferential surface, and to abut the additional die. The non-abutment surface is continued to the outside surface and configured to extend, when forming the spool, so as to surround the outer circumferential surface, while maintaining a distance from the additional die abutting the abutment surface, thereby to form a space surrounding the outer circumferential surface between the abutment surface and the outer circumferential surface. The non-abutment surface comprises an inner area configured to extend, when forming the spool, so as to surround the outer circumferential surface and an outer area configured to extend, when forming the spool, so as to surround the outer circumferential surface and located closer to the abutment surface than the inner area. The outer area is recessed in a direction opposite to the additional die, as compared with the inner area.

By using the pool forming die and the additional die, it is possible to form a spool in which a clearance is formed between the first portion and the second portion in the top region, while the first portion and the second portion substantially abut each other in the base region. In the base region of the spool, variation in height of the spool can be reduced since the first and the second portion substantially abut each other. On the other hand, in the top region, a clearance is formed between the first portion and the second portion, thereby inhibiting excessive bending of the spool in the top region, and thus, concentration of stress in the top region can be reduced. Accordingly, variation in height of the spool and generation of cracks can be reduced.

The spool forming die may further comprise a top surface continued to the abutment surface and the non-abutment surface, and an inside surface configured to be arranged, when forming the spool, to cover an inner circumferential surface of the pipe, in which the inside surface faces the top surface.

According to the above-described configuration, it is possible to suitably form the spool.

The spool forming die may further comprise a pressing portion configured to press a rim surrounding an opening of the pipe when forming the spool.

According to the above-described configuration, it is possible to suitably form the spool.

A further aspect of the present disclosure is a manufacturing method of a pipe including a spool to be used for connection with another member and formed in an outer circumferential surface of the pipe to extend so as to surround the outer circumferential surface. In the manufacturing method, the spool forming die and the additional die are arranged so as to surround the pipe and align along the pipe. By pressing a rim surrounding an opening of the pipe and causing the spool forming die and the additional die to abut each other, the spool is formed.

The additional die comprises an outside surface and an abutment surface. The outside surface of the additional die is configured to be arranged, when forming the spool, to cover the outer circumferential surface so as to surround the outer circumferential surface. The abutment surface of the additional die is configured to be arranged, when forming the spool, so as to surround the outer circumferential surface and to abut the spool forming die.

According to the above-described configuration, it is possible to form a pipe including a spool in which a clearance is formed between the first portion and the second portion in the top region, while the first portion and the second portion substantially abut each other in the base region. In the base region of the spool, variation in height of the spool can be reduced since the first and the second portion substantially abut each other. On the other hand, in the top region, a clearance is formed between the first portion and the second portion, thereby inhibiting excessive bending of the spool in the top region, and thus, concentration of stress in the top region can be reduced. Accordingly, variation in height of the spool and generation of cracks can be reduced.

BRIEF DESCRIPTION OF THE DRAWINGS

Embodiments of the present disclosure will be described hereinafter by way of example with reference to the accompanying drawings, in which.

DETAILED DESCRIPTION OF EXEMPLARY EMBODIMENTS

The present disclosure is not limited to embodiments described below, but may be in various forms within the technical scope of the present disclosure.

1. Overview of Pipe

Figure 1:
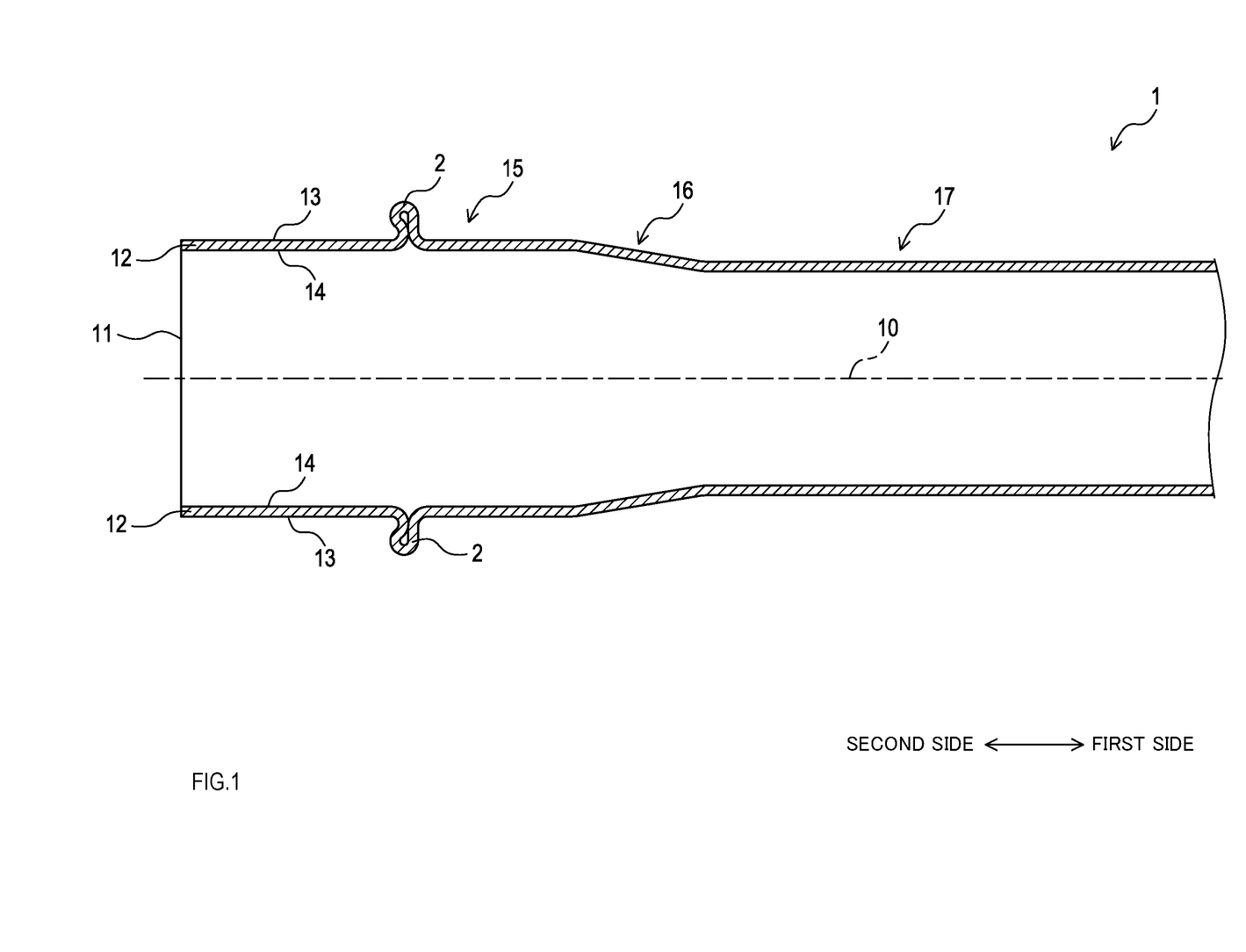
FIG. 1 is a sectional view of a pipe along an axis of the pipe.
Figure 2:
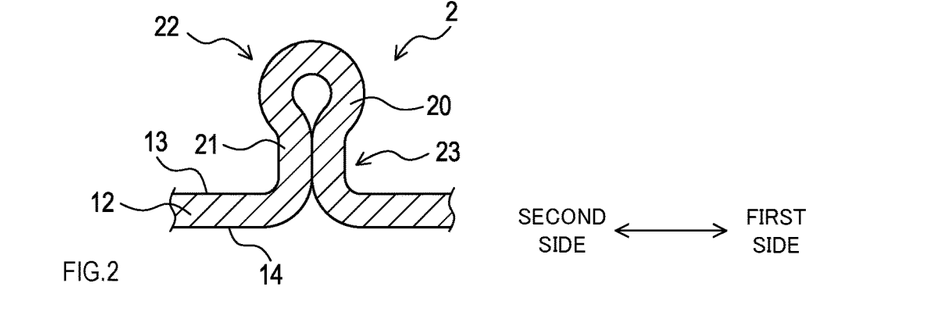
FIG. 2 is a sectional view of a spool along the axis of the pipe.

A pipe 1 of the present embodiment extends substantially linearly along an axis 10 from a first side toward a second side (see FIG. 1). A cross-section of the pipe 1 orthogonal to the axis 10 has, for example, a substantially circular shape, and the axis 10 passes through an approximate center of the cross-section. Hereinafter, an opening of the pipe 1 on the second side is referred to as a "second opening 11". The pipe 1 is made of, for example, iron. More specifically, the pipe 1 may be made of, for example, stainless steel or high tensile strength steel. The pipe 1 may be made of a metal other than iron. The pipe 1 comprises a side wall 12, an expanded pipe portion 15, a tapered portion 16, a main body portion 17, and a spool 2.

The side wall 12 is a wall-shaped portion separating inside and outside of the pipe 1. An outer surface of the side wall 12 forms an outer circumferential surface 13 of the pipe 1, and an inner surface of the side wall 12 forms an inner circumferential surface 14.

The expanded pipe portion 15 is a portion where a process of expanding a diameter of the pipe 1 (hereinafter referred to as "pipe expansion") has been performed. In the present embodiment, the expanded pipe portion 15 is provided, by way of example, at an end on the second side of the pipe 1. In addition, the pipe 1 may comprise, for example, a portion where a process of reducing the diameter (hereinafter referred to as "pipe contraction") has been performed. There is a concern that a portion that has undergone pipe expansion or pipe contraction in the pipe 1 may have work-hardening problems as compared with other portions.

On the other hand, the main body portion 17 is a portion where pipe expansion is not performed in the pipe 1, and the tapered portion 16 is a portion connecting the main body portion 17 and the expanded pipe portion 15. The tapered portion 16 having a tapered shape has a diameter increasing toward the second side.

The spool 2 is provided in a vicinity of the second opening 11 of the pipe 1. The spool 2 protrudes from the outer circumferential surface 13 of the pipe 1 and extends to surround the outer circumferential surface 13. The spool 2 is formed by bending a part of the side wall 12 so as to protrude from the outer circumferential surface 13. The spool 2 is used to connect the pipe 1 to another member, which will be detailed later.

In the present embodiment, the spool 2 is formed in the expanded pipe portion 15, by way of example. However, the spool 2 may be formed, for example, in a portion of the pipe where pipe contraction has been performed. Alternatively, the spool 2 may be formed, for example, in a part of the pipe 1 where pipe expansion or pipe contraction has not been performed.

2. With Respect to Spool

The spool 2 comprises a first portion 20 and a second portion 21 that are parts of the side wall 12 (see FIGS. 2 to 9). The first portion 20 and the second portion 21 form a bent portion protruding from the outer circumferential surface 13 of a part of the side wall 12. The first portion 20 and the second portion 21 overlap each other in a direction of the axis 10, and the first portion 20 is located on the first side and the second portion 21 is located on the second side.

A region of the spool 2 including its outer circumferential end is referred to as a "top region 22". A region between the top region 22 and a region of the side wall 12 around the spool 2 is referred to as a "base region 23". The top region 22 and the base region 23 each extend to surround the axis 10.

Specifically, the top region 22 includes outer circumferential ends of the first portion 20 and the second portion 21, and forms a bent portion where the first portion 20 and the second portion 21 are connected each other. The base region 23 includes parts of the first portion 20 and the second portion 21 positioned on an inner circumferential side than the top region 22.

In the top region 22, a clearance is formed between the first portion 20 and the second portion 21 such that the clearance extends to surround the axis 10. Specifically, at least one portion of the first portion 20 or the second portion 21 is bent so as to expand toward a side where the at least one portion is located, and the bending results in forming the clearance.

Figure 8:
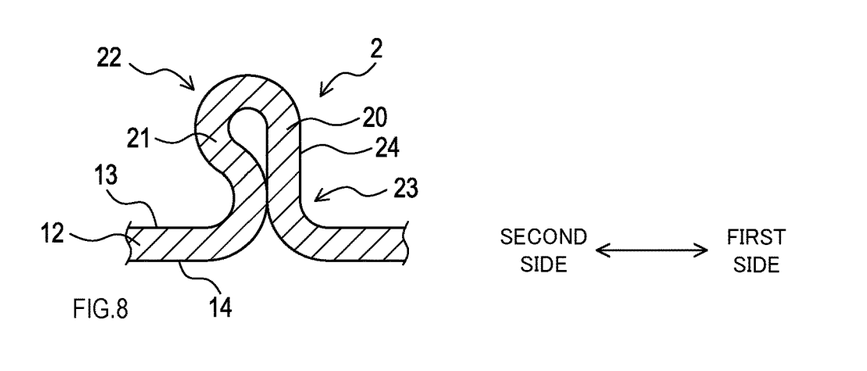
FIG. 8 is a sectional view of a spool along the axis of the pipe.
Figure 9:
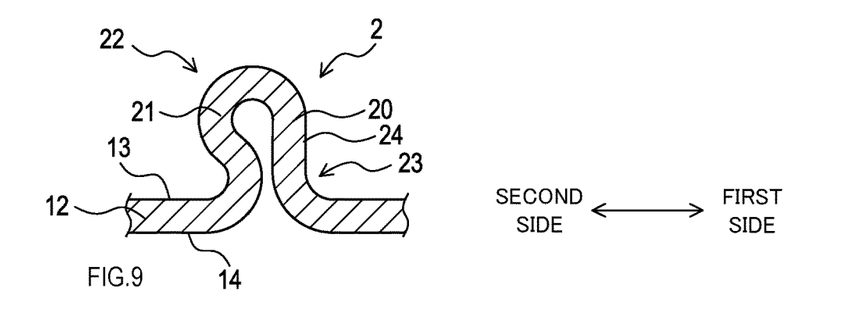
FIG. 9 is a sectional view of a spool along the axis of the pipe.

More specifically, as shown in FIGS. 2 to 7, the first portion 20 and the second portion 21 in the top region 22 may be bent to expand toward the first side and the second side, respectively. Alternatively, as shown in FIGS. 8 and 9, only the second portion 21 in the top region 22 may be bent to expand toward the second side. Also, only the first portion 20 in the top region 22 may be bent to expand toward the first side.

Further, as shown in FIGS. 2 to 5, the first portion 20 and the second portion 21 in the top region 22 may be substantially symmetrical with respect to a reference plane orthogonal to the axis 10. Alternatively, as shown in FIGS. 6 to 9, the first portion 20 and the second portion 21 in the top region 22 may be asymmetrical.

On the other hand, in the base region 23, the first portion 20 and the second portion 21 substantially abut each other, and an abutting portion extends so as to surround the axis 10. Specifically, "substantially abut" means that, in the base region 23, the first portion 20 and the second portion 21 abut each other (see FIGS. 2, 3, 6, and 8), or the first portion 20 and the second portion 21 are located close to each other with a slight clearance therebetween (see FIGS. 4, 5, 7, and 9). When forming the spool 2, the pipe 1 is pressed such that the first portion 20 and the second portion 21 abut each other in the base region 23, which will be detailed later. However, there is a possibility that the first portion 20 and the second portion 21 separate from each other entirely or partially in the base region 23 due to springback after the pressing is released. A state where the first portion 20 and the second portion 21 are located close to each other in the base region 23 may be caused by, for example, separation of the first portion 20 and the second portion 21 from each other due to springback.

As shown in FIGS. 3, 5, 8, and 9, the top region 22 may comprise a straight part 24, which extends substantially planarly in a direction crossing the axis 10. In the present embodiment, the straight part 24 extends, for example, in a direction substantially orthogonal to the axis 10. However, the direction of the straight part 24 may be appropriately specified. The straight part 24 is used to lock connection between the pipe 1 and another member, which will be detailed later.

In the present embodiment, the straight part 24 is formed, by way of example, in the first portion 20 in the top region 22. However, the straight part 24 may be formed in the second portion 21 in the top region 22. Also, the straight part 24 may be formed in both the first portion 20 and the second portion 21 in the top region 22.

Figure 3:
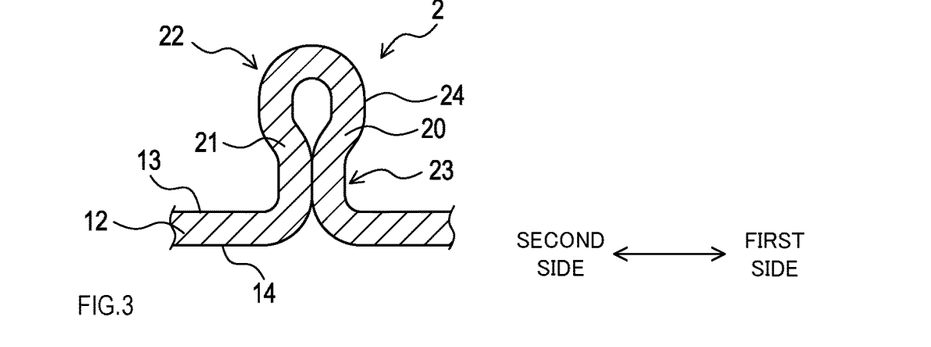
FIG. 3 is a sectional view of a spool along the axis of the pipe.
Figure 4:
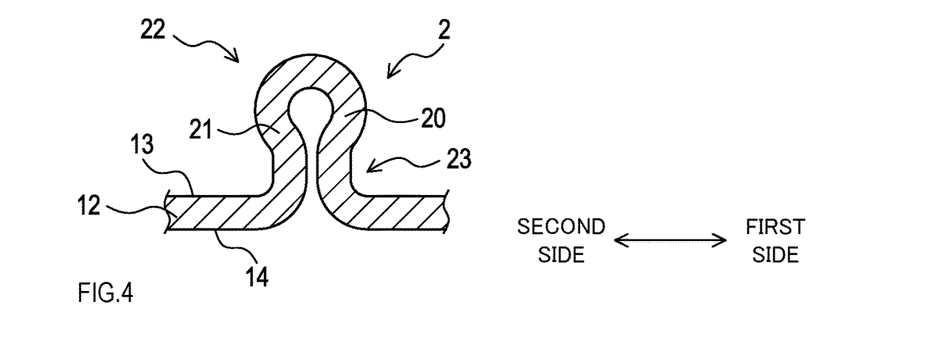
FIG. 4 is a sectional view of a spool along the axis of the pipe.
Figure 5:
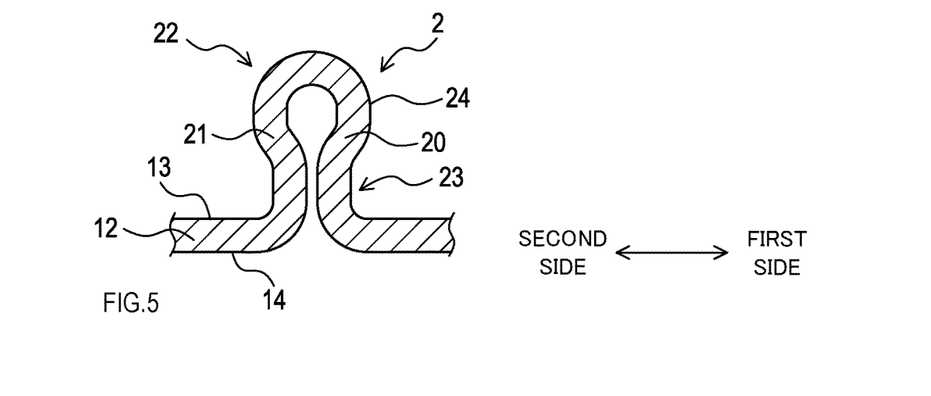
FIG. 5 is a sectional view of a spool along the axis of the pipe.
Figure 6:
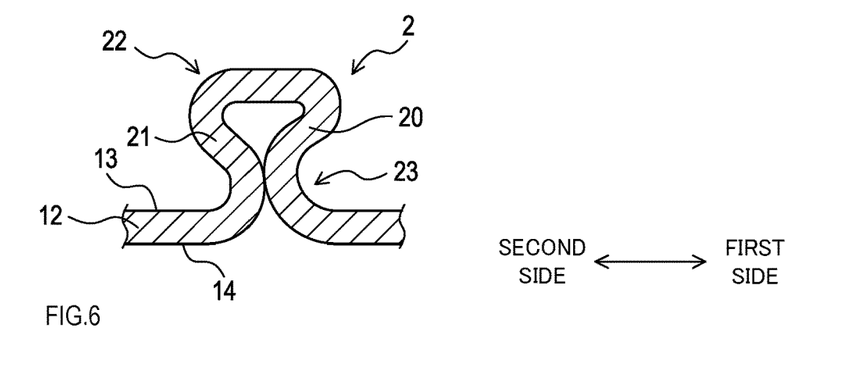
FIG. 6 is a sectional view of a spool along the axis of the pipe.
Figure 7:
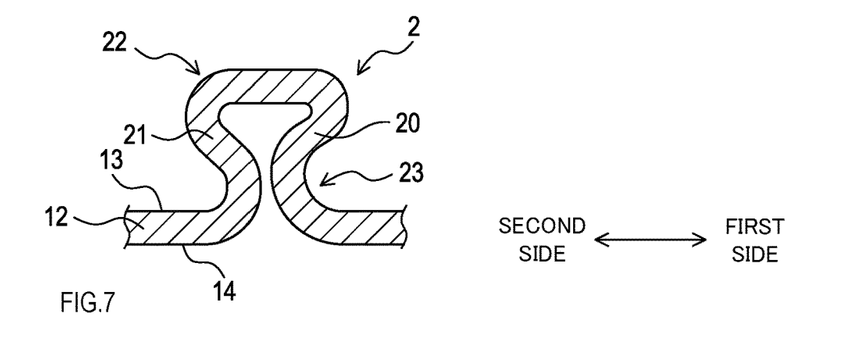
FIG. 7 is a sectional view of a spool along the axis of the pipe.

Further, as shown in FIGS. 3 and 5, the straight part 24 may be formed in a part of the first portion 20 in the top region 22. Alternatively, as shown in FIGS. 8 and 9, the straight part 24 may be formed in a whole area of the first portion 20 in the top region 22, so that the first portion 20 in the top region 22 and the first portion 20 in the base region 23 are flush with each other. In other words, the straight part 24 may be formed in the top region 22 and the base region 23 of the first portion 20 or the second portion 21.

3. With Respect to Connection of Pipe

The pipe 1 of the present embodiment is mounted, by way of example, on a vehicle, and used as a flow path of fuel for the vehicle. The second opening 11 of the pipe 1 is connected to a connection port 70 of a quick connector 7 to be mounted on the vehicle (see FIG. 10). The quick connector 7 is made of resin, and comprises a main body 71, an opening portion 72, and a chucker 73.

Figure 10:
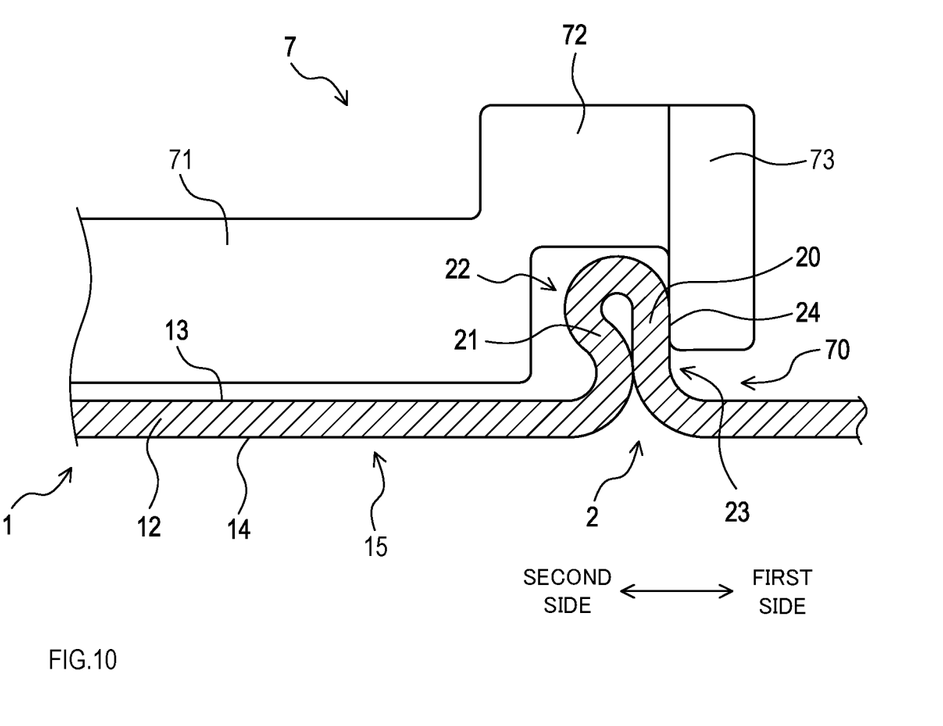
FIG. 10 is a sectional view, along the axis of the pipe, of the pipe and a quick connector connected to the pipe.

The main body 71 comprises a hole into which the pipe 1 is insertable. The hole has a diameter that is smaller than a diameter of the spool 2 of the pipe 1, and a part of the pipe 1 on the second side relative to the spool 2 can be inserted into the main body 71.

The opening portion 72 is provided to surround an opening of the hole of the main body 71. Thus, the spool 2 of the pipe 1 connected with the hole is located inside the opening portion 72. Hereinafter, a position of the pipe 1 when the spool 2 is located inside the opening portion 72 is referred to as a "connection position".

The chucker 73 is provided to the opening portion 72 so as to surround the connection port 70 and is displaceable between a lock position and a release position by approaching and moving away from the pipe 1 inserted into the main body 71.

When the chucker 73 is in the release position, a part of the pipe 1 in which the spool 2 is formed can pass through the chucker 73. Thus, it is possible to insert the pipe 1 into the quick connector 7 until reaching the connection position, and also possible to pull the pipe 1 in the connection position from the quick connector 7.

On the other hand, when the chucker 73 is in the lock position, the spool 2 of the pipe 1 in the connection position is locked by the chucker 73. Thus, if an attempt to pull the pipe 1 from the quick connector 7 is made, the spool 2 abuts the chucker 73, and the pipe 1 cannot be pulled out. In a case where the straight part 24 is formed in the first portion 20 of the spool 2, as shown in FIG. 10, the straight part 24 and the chucker 73 in the lock position may be brought into surface contact with each other when an attempt to pull the pipe 1 from the quick connector 7 is made. As a result, an increased load is required to forcibly pull the pipe 1 locked by the chucker 73 from the quick connector 7. Also, when the chucker 73 is in the lock position, the pipe 1 cannot be inserted into the quick connector 7 until reaching the connection position.

4. With Respect to Die Set

Next, a description will be given of a die set 3 to be used to form the spool 2 in the vicinity of the second opening 11 of the pipe 1 (see FIGS. 11 and 12). The die set 3 is configured, by way of example, to form the spool 2 as shown in FIG. 8 or 9, and comprises a first die 4 and a second die 5. When forming the spool 2, the first die 4 and the second die 5 are arranged to be adjacent to the outer circumferential surface 13 of the pipe 1 and to surround the outer circumferential surface 13. In this case, the first die 4 and the second die 5 are arranged along the axis 10 such that the first die 4 is located on the first side and the second die 5 is located on the second side.

The first die 4 comprises a first outside surface 40 and a first abutment surface 41, and is brought into a state of being penetrated by the pipe 1 when forming the spool 2.

When forming the spool 2, the first outside surface 40 is arranged to surround the outer circumferential surface 13 of the pipe 1 and covers an area of the outer circumferential surface 13 on the first side relative to a forming position of the spool 2. Specifically, the first outside surface 40 covers a part of the expanded pipe portion 15 on the first side relative to the spool 2, the tapered portion 16, and the main body portion 17.

The first abutment surface 41 is a substantially planar surface continued to an end of the first outside surface 40 on the second side. When forming the spool 2, the first abutment surface 41 is arranged to surround the outer circumferential surface 13, extending outward from the end of the first outside surface 40 in a radial direction of the pipe 1 so as to abut the second abutment surface 61 of the second die 5. Also, the first abutment surface 41 is arranged in the forming position of the spool 2. In the present embodiment, by way of example, the first abutment surface 41 extends in the direction substantially orthogonal to the axis 10 of the pipe 1. However, the direction of the first abutment surface 41 may be specified appropriately.

The second die 5 comprises a base 50, an inner portion 51, a pressing portion 53, and an outer portion 6.

The base 50 is arranged to face the second opening 11 of the pipe 1 when forming the spool 2. The inner portion 51 and the outer portion 6 are each provided to protrude from the base 50.

The inner portion 51 having a cylindrical shape is inserted from the second opening 11 into an inside of the pipe 1 and brought into a state of extending along the axis 10 when forming the spool 2. In this case, an end of the inner portion 51 reaches, by way of example, a position on the first side relative to the forming position of the spool 2 in the expanded pipe portion 15. However, this is not limitative, and the end of the inner portion 51 may reach, for example, the tapered portion 16 or the main body portion 17. An outer circumferential surface of the inner portion 51 is referred to as an "inside surface 52". When forming the spool 2, an entire area of the inside surface 52 covers the inner circumferential surface 14 of the pipe 1.

The outer portion 6 is provided to surround the inside surface 52 in a state where there is a clearance between the outer portion 6 and the inside surface 52 of the inner portion 51. When forming the spool 2, the outer portion 6 is arranged to extend along the axis 10, and the side wall 12 of the pipe 1 is arranged between the outer portion 6 and the inner portion 51.

The outer portion 6 comprises a second outside surface 60, a second abutment surface 61, a top surface 62, and a non-abutment surface 63.

When forming the spool 2, the second outside surface 60 is arranged to surround the outer circumferential surface 13 and covers an entire area of the outer circumferential surface 13 on the second side relative to the forming position of the spool 2.

When forming the spool 2, the second abutment surface 61 is arranged to surround the outer circumferential surface 13 while maintaining a distance from the outer circumferential surface 13. The second abutment surface 61 is a substantially planar surface extending in the radial direction of the pipe 1, and is configured to abut the first abutment surface 41. Also, the second abutment surface 61 is arranged in the forming position of the spool 2. In the present embodiment, by way of example, the second abutment surface 61 extends in the direction substantially orthogonal to the axis 10 of the pipe 1. However, the direction of the second abutment surface 61 may be specified appropriately.

When forming the spool 2, the top surface 62 extends from an end of the second abutment surface 61 closer to the outer circumferential surface 13 toward the second side so as to surround the outer circumferential surface 13, while maintaining a substantially constant distance from the outer circumferential surface 13. Also, the top surface 62 faces the inside surface 52.

When forming the spool 2, the non-abutment surface 63 extends from an end of the top surface 62 on the second side to an end of the second outside surface 60 on the first side so as to surround the outer circumferential surface 13. Also, the non-abutment surface 63 maintains a distance from the first abutment surface 41 of the first die 4 that abuts the second abutment surface 61, and thereby forms a space (hereinafter referred to as a "spool space") surrounding the outer circumferential surface 13 between the second abutment surface 61 and the outer circumferential surface 13.

Further, the non-abutment surface 63 comprises an outer area 64 and an inner area 65. The inner area 65 extends along the second outside surface 60 so as to surround the outer circumferential surface 13. The outer area 64 extends so as to surround the outer circumferential surface 13, and is located closer to the second abutment surface 61 than the inner area 65 (in other words, located outwardly). The outer area 64 is adjacent to the top surface 62 and extends along the top surface 62 so as to surround the outer circumferential surface 13. The outer area 64 is formed to be recessed than the inner area 65 toward the second side.

The pressing portion 53 is located at the depth of the clearance between the inner portion 51 and the outer portion 6 in the base 50. When forming the spool 2, an end of the side wall 12 of the pipe 1 on the second side arranged between the outer portion 6 and the inner portion 51 is pressed by the pressing portion 53. In other words, when forming the spool 2, a rim of the pipe 1 surrounding the second opening 11 is pressed by the pressing portion 53.

5. With Respect to Formation of Spool

Next, a description will be given of a formation method of the spool 2 in the pipe 1 using the die set 3. In other words, the formation method corresponds to a manufacturing method of the pipe 1 provided with the spool 2. The formation method comprises an arrangement step and a pressing step.

Figure 11:
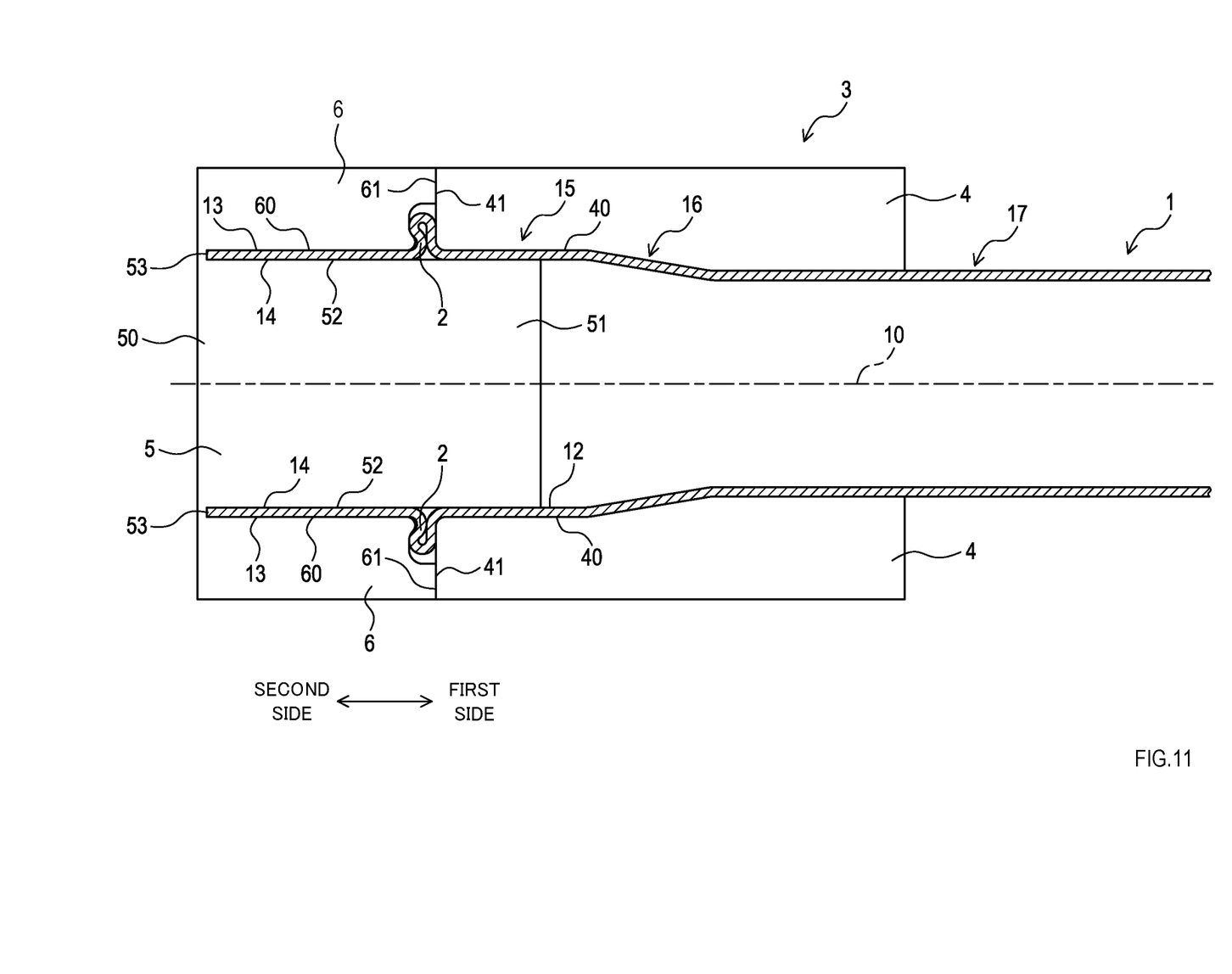
FIG. 11 is a sectional view, along the axis of the pipe, of the pipe, a first die, and a second die.
Figure 12:
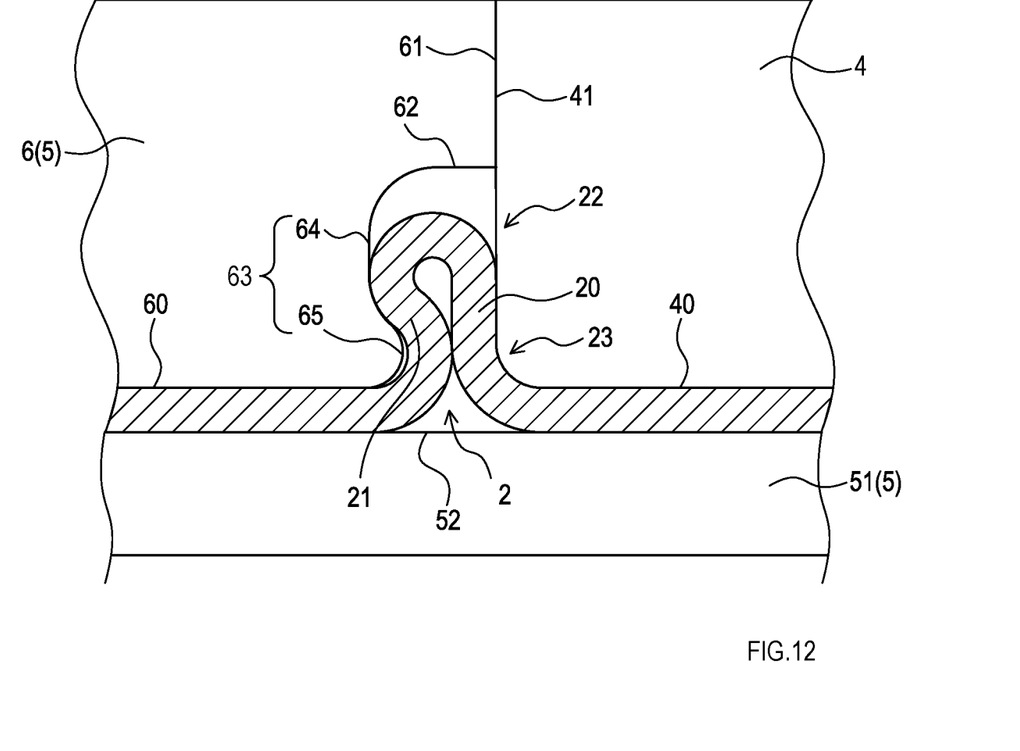
FIG. 12 is a sectional view, along the axis of the pipe, of a spool of the pipe, the first die, and the second die.

In the arrangement step, the first die 4 and the second die 5 are arranged so as to surround the pipe 1 in which the expanded pipe portion 15, the tapered portion 16, and the main body portion 17 have been formed and the spool 2 has not been formed (see FIG. 11). In this case, the first die 4 is arranged on the first side, while the second die 5 is arranged on the second side, and an entire area of the first outside surface 40 of the first die 4 covers a part of the outer circumferential surface 13 of the pipe 1 located on the first side relative to the forming position of the spool 2.

Also, a part of the pipe 1 including its end on the second side is inserted between the inner portion 51 and the outer portion 6 of the second die 5. As a result, an entire area of the second outside surface 60 of the second die 5 covers a part of the outer circumferential surface 13 of the pipe 1 located on the second side relative to the forming position of the spool 2, and an entire area of the inside surface 52 of the second die 5 covers the inner circumferential surface 14 of the pipe 1. Further, the pressing portion 53 of the second die 5 abuts the rim of the pipe 1 surrounding the second opening 11. In this state, a distance is formed between the first abutment surface 41 of the first die 4 and the second abutment surface 61 of the second die 5.

In the subsequent pressing step, at least one of the first die 4 or the second die 5 is displaced such that the first abutment surface 41 of the first die 4 and the second abutment surface 61 of the second die 5 abut each other. Specifically, for example, the second die 5 may be displaced toward the first side, or the first die 4 may be displaced toward the second side, or the second die 5 may be displaced toward the first side while displacing the first die 4 toward the second side. As a result, the rim surrounding the second opening 11 of the pipe 1 is pressed by the pressing portion 53 of the second die 5. This pressing is continued until the first abutment surface 41 and the second abutment surface 61 abut each other.

As a result, at the forming position of the spool 2 in the outer circumferential surface 13 of the pipe 1, the spool space extending to surround the outer circumferential surface 13 is formed by the top surface 62 and the non-abutment surface 63 of the second die 5. On the other hand, a part of the outer circumferential surface 13 except for the forming position of the spool 2 is covered with the first outside surface 40 of the first die 4 and the second outside surface 60 of the second die 5. Also, the inner circumferential surface 14 of the pipe 1 is covered with the inside surface 52 of the second die 5.

Thus, due to the pressing of the rim of the second opening 11 of the pipe 1 by the pressing portion 53, a part of the side wall 12 of the pipe 1 adjacent to the spool space is bent so as to protrude into the spool space, and the bent portion forms the spool 2. The bent portion on the first side and the bent portion on the second side form the first portion 20 and the second portion 21, respectively.

The first abutment surface 41 and the non-abutment surface 63 are arranged, respectively, on the first side and the second side of the spool space. Thus, the spool 2 to be newly formed is held by these surfaces. Specifically, the first portion 20 and the second portion 21 of the spool 2 are pressed, respectively, by the first abutment surface 41 and the non-abutment surface 63.

The first abutment surface 41 extends substantially planarly. Thus, as shown in FIGS. 8 and 9, the first portion 20 of the spool 2 to be newly formed extends substantially planarly in a direction substantially orthogonal to the axis 10. In the non-abutment surface 63, the outer area 64 is recessed toward the second side, as compared with the inner area 65. Thus, in the second portion 21 of the spool 2, the base region 23 is pressed toward the first side by the inner area 65, and the top region 22 is bent so as to expand toward the second side. As a result, the second portion 21 abuts the first portion 20 in the base region 23. Due to springback after the pressing is completed, in the base region 23, the second portion 21 is displaced toward the second side, and a slight clearance can be generated between the first portion 20 and the second portion 21 (see FIG. 9). On the other hand, in the top region 22, the second portion 21 is bent toward the second side, and thus a clearance is formed between the first portion 20 and the second portion 21.

6. Effects (1) According to the pipe 1 of the above-described embodiment, in the base region 23 of the spool 2, the first portion 20 and the second portion 21 substantially abut each other, thereby reducing variation in height of the spool 2. On the other hand, in the top region 22, a clearance is formed between the first portion 20 and the second portion 21, thereby inhibiting excessive bending of the spool 2 in the top region 22; thus, concentration of stress in the top region 22 can be reduced. Particularly, for example, when removing the first and second dies 4 and 5 from the pipe 1 after forming the spool 2 in the pipe 1 using the first and second dies 4 and 5, the spool 2 might be pulled. However, generation of inside cracks in the top region 22 of the spool 2 due to such pulling action can be reduced. Accordingly, variation in height of a spool and generation of cracks can be reduced.

(2) Surface contact between the straight part 24 formed in the first portion 20 of the spool 2 and the chucker 73 of the quick connector 7 locks connection between the quick connector 7 and the pipe 1. This leads to an increased load required to forcibly pull the pipe 1 in a locked state out of the quick connector 7. Thus, it is possible to inhibit release of locking between a pipe and another member.

(3) The spool 2 is formed in the expanded pipe portion 15, in which work hardening may be caused, and enables reduction in concentration of stress in the top region 22 of the spool 2. Thus, generation of cracks can be reduced effectively.

(4) By using the die set 3 of the above-described embodiment, the spool 2 can be formed in the pipe 1 suitably.

7. Other Embodiments (1) In the above-described embodiment, the spool 2 is formed in a linearly extending portion of the pipe 1. However, a spool similar to that of the above-described embodiment may be formed in a bent portion of a pipe.

(2) In the above-described embodiment, the second die 5 has a configuration in which the inner portion 51 and the outer portion 6 are integrally formed. However, the inner portion 51 and the outer portion 6 may be configured as separate dies. In this case, a die corresponding to the outer portion 6 (hereinafter referred to as an "outer die") and a die corresponding to the inner portion 51 (hereinafter referred to as an "inner die") may be arranged in a similar manner as in the arrangement step. Then, in a similar manner as in the pressing step, the outer die, the inner die, and the first die 4 may be displaced while pressing the rim surrounding the second opening 11 of the pipe 1 toward the first side. Also in such a case, the spool 2 can be formed in a similar manner.

(3) The first abutment surface 41 in the first die 4 of the above-described embodiment may comprise a top surface and a non-abutment surface similar to those provided in the second abutment surface 61 of the second die 5. In this case, when forming the spool 2, the first abutment surface 41 is arranged to surround the outer circumferential surface 13 while maintaining a distance from the outer circumferential surface 13, and the spool space is formed inside the first and the second abutment surfaces 41 and 61. Thus, as shown in FIGS. 2 to 7, the spool 2 is formed in which the first portion 20 and the second portion 21 in the top region 22 are bent to expand toward the first side and the second side, respectively.

Further, the following configuration may be employed: The first abutment surface 41 of the first die 4 comprises a top surface and a non-abutment surface, while the second abutment surface 61 of the second die 5 does not comprise a top surface or a non-abutment surface, and the second abutment surface 61 may be formed to be continued to the end of the second outside surface 60 on the first side. By using the first and second dies 4 and 5 configured as above, the spool 2 is formed such that the second portion 21 extends in a substantially planar manner, and the first portion 20 expands toward the first side in the top region 22.

(4) A plurality of functions served by a single element in the above-described embodiments may be achieved by a plurality of elements, or a function served by a single element may be achieved by a plurality of elements. Also, a plurality of functions served by a plurality of elements may be achieved by a single element, or a function served by a plurality of elements may be achieved by a single element. Further, a part of a configuration in any of the above-described embodiments may be omitted. Moreover, at least a part of a configuration in any of the above-described embodiments may be added to, or replace, a configuration in another of the embodiments.

9. Correspondence of Terms

The first die 4 of the above-described embodiment corresponds to one example of an additional die, and the second die 5 corresponds to one example of a spool forming die. The first outside surface 40 corresponds to one example of an outside surface of the additional die, and the first abutment surface 41 corresponds to one example of an abutment surface of the additional die. The second outside surface 60 corresponds to one example of an outside surface of the spool forming die, and the second abutment surface 61 corresponds to one example of an abutment surface of the spool forming die.

What is claimed is:

1. A pipe extending from a first side toward a second side, the pipe comprising:
    a side wall separating an inside and an outside of the pipe; and
    a spool that is a part of the side wall formed bent so as to protrude from an outer circumferential surface of the pipe and extending to surround the outer circumferential surface,
    the spool comprising:
        a first portion located on the first side; and
        a second portion located on the second side,
    wherein there is a clearance between the first portion and the second portion in a top region that comprises an outer circumferential end of the spool,
    wherein the first portion and the second portion substantially abut each other in a base region located between the top region and a region of the side wall around the spool,
    wherein the spool is formed at a distance from an opening of the pipe on the second side,
    wherein the first portion in the top region comprises a straight part that extends planarly, wherein the straight part is formed in the top region and the base region,
    wherein the second portion in the top region is bent to expand toward the second side relative to the second portion in the base region,
    wherein the pipe comprises a first section, a second section, and a boundary portion, the second section including the opening on the second side, and the boundary portion being situated between the first section and the second section,
    wherein the first section and the second section are different in diameter of a cross section perpendicular to a longitudinal direction of the pipe,
    wherein the spool is disposed in the second section at a distance from the boundary portion, and
    wherein, in the second section, a diameter of the cross section of a portion of the pipe adjacent to the spool on the first side is substantially identical to a diameter of the cross section of a portion of the pipe adjacent to the spool on the second side.

2. The pipe according to claim 1, wherein the pipe is made of iron.

* * * * *